Nov. 28, 1933.  A. D. NASH  1,937,203
GLASS COFFEE MAKING MACHINE
Filed Jan. 2, 1932   2 Sheets-Sheet 1
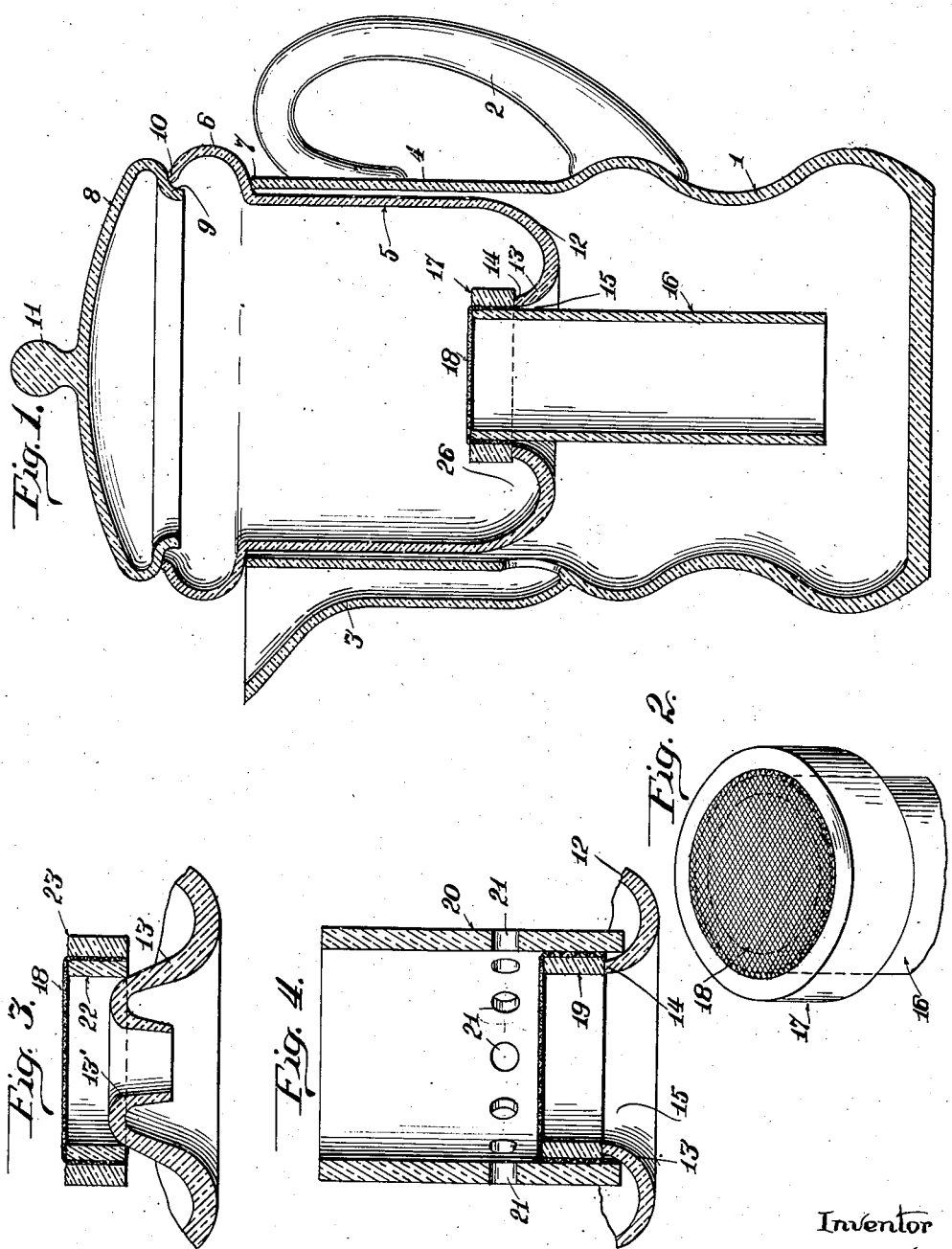
Inventor
Arthur Douglas Nash
By Barnett Truman
Attorneys

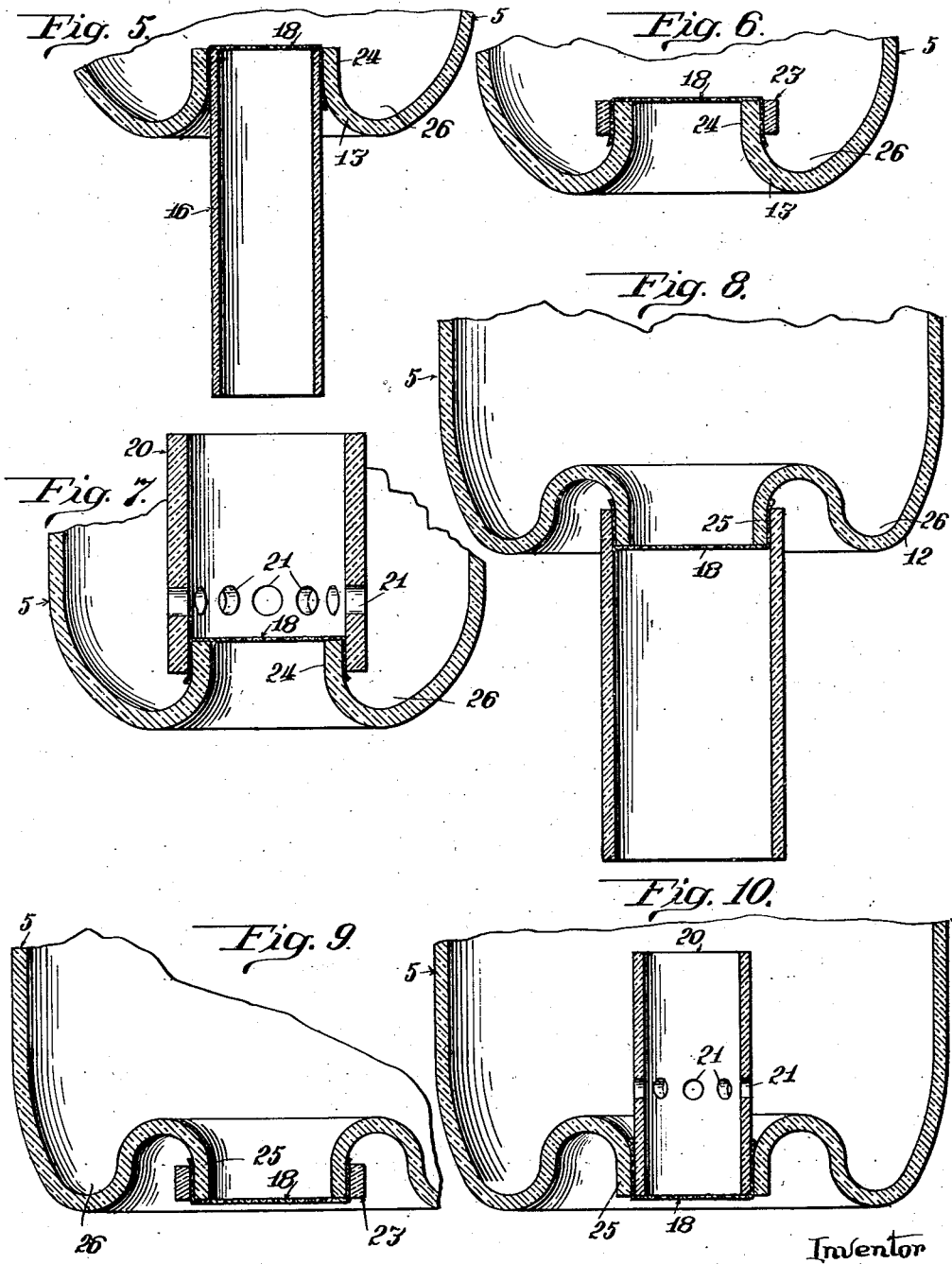

Patented Nov. 28, 1933

1,937,203

UNITED STATES PATENT OFFICE 1,937,203

GLASS COFFEE MAKING MACHINE

Arthur Douglas Nash, Toledo, Ohio, assignor to The Libbey Glass Manufacturing Company, Toledo, Ohio, a corporation of Ohio Application January 2, 1932. Serial No. 584,343

5 Claims. (Cl. 53—3)

This invention relates to certain new and useful improvements in a coffee making apparatus, and more particularly to a combined glass coffee pot and machine for making drip coffee, the machine consisting of a few simple, interfitting parts, all made of glass with the exception of a small sheet of fabric used as a strainer.

Machines for making drip coffee usually consist of an outer pot into which the coffee drips and from which it may be poured, an upper receptacle or liner which fits removably into the upper portion of the pot and in which the ground coffee is placed, a removable cover for the liner and pot, and a filtering device in the lower end of the liner member through which the liquid coffee drips when hot water is poured through the ground coffee in the liner. Devices of this character have customarily been made of metal or metal and fabric. According to the present invention the entire apparatus is constructed of glass, with the exception of a small removable and renewable sheet of fabric filtering material, so that the parts may be easily and completely cleaned and kept in a sanitary condition.

The principal object of this invention is to provide an improved glass coffee making apparatus of the type briefly referred to hereinabove and disclosed in detail in the specifications which follow.

Another object is to provide an improved form of filtering or straining device for use in a coffee making machine.

Other objects and advantages of this invention will be more apparent from the following detailed description of certain approved forms of apparatus constructed according to the principles of this invention.

In the accompanying drawings:

Fig. 1 is a central vertical section through one approved form of the apparatus.

Fig. 2 is a perspective view of the upper portion of the filtering device as used in Fig. 1.

Figs. 3 and 4 are central vertical sections showing modified forms of the filtering apparatus.

Figs. 5, 6 and 7 show other modifications, similar to those shown in Figs. 1, 3 and 4, respectively, but omitting one of the rings.

Figs. 8, 9 and 10 show other modifications similar in some respects to those shown in Figs. 5, 6 and 7, respectively.

Referring first to Figs. 1 and 2, at 1 is indicated the outer coffee pot which may be made of any desired ornamental configuration and is provided with a handle 2 and pouring spout 3 as usual in such devices. The pot is constructed entirely of heat-resisting glass, as are all of the other permanent parts of the apparatus, as hereinafter described. The upper portion 4 of the pot is preferably of hollow cylindrical form with an open upper end, so that the liner member, hereinafter described, may fit telescopically therein.

The liner 5 is a hollow glass receptacle, having substantially cylindrical side walls adapted to fit loosely within the upper portion 4 of the pot. At its upper end the liner is formed with an outwardly projecting portion, here shown as a hollow annular rounded rib or shoulder 6 which rests upon the upper edge 7 of the pot to support the receptacle or liner 5 within the upper portion 4 of the pot. A glass cover 8 has its edge portions rounded inwardly and downwardly at 9 so as to fit within the open upper end 10 of the liner. This cover is preferably provided with a knob or handle 11 by means of which it may be lifted into or out of position. It will be noted that the upper edge 10 of the liner member is inturned so that the opening in the top of the latter is substantially of the same diameter as the opening in the top 7 of the pot, so that the same closure member 8 may be used for covering the pot when the liner has been removed.

The bottom wall of liner 5 curves inwardly and downwardly toward the center, as indicated at 12, and then upwardly and inwardly at 13, terminating in an upwardly presented annular shoulder 14 surrounding a central opening 15.

The filtering device comprises a pair of annular glass members 16 and 17 adapted to telescope over one another and clamp the edge portions of a small sheet 18 of filtering material, usually a suitable fabric such as canton-flannel. In the form shown in Figs. 1 and 2, the inner glass member 16 is in the form of a rather long piece of hollow cylindrical tubing open at both ends. The glass ring 17 is of such diameter that it will telescope over the upper end of tube 16 with sufficient clearance to tightly clamp the edge portions of the flexible sheet 18 which will be stretched across the open upper end of tube 16. The diameters of the glass members 16 and 17 are such that the ring 17 will rest upon the annular shoulder 14 in the bottom of the liner 5, and the tube 16 will extend downwardly through the opening 15 so as to properly center the filtering device and hold it in position. The principal reason for forming the inner member 16 as a relatively long tube is so that this filtering device will be of sufficient size to be easily handled and not be inadvertenty lost or discarded while the parts are being disassembled for cleaning purposes.

Except for this advantage, the inner tube 16 need only be long enough to extend down through the opening 15 far enough to hold the filtering device in centered position.

In the alternative form of filtering device shown in Fig. 4, the inner glass ring 19 is of a diameter suitable to rest on the annular shoulder 14 of the liner member, and to telescope within the lower end of the outer tubular glass member 20 so as to clamp the filtering sheet 18 within the lower end of this tube. The tube 20 is preferably of sufficiently large diameter to fit over the upwardly extending portion 13 of the bottom of the liner. The outer tube 20 may be made of sufficient length to extend upwardly a considerable distance within the liner 5, so that the filtering device may be easily handled and will not be lost. If the tube 20 is provided with this upward extension, it will be formed with an annular series of openings 21 located just above the position of the filtering sheet 18 so as to permit the liquid coffee to flow through the tube 20 above the filtering sheet and thence downwardly through this sheet and through opening 15 into the lower portion of pot 1.

In the simple form of the filtering device shown in Fig. 3, a pair of cylindrical glass rings 22 and 23 of similar height are adapted to telescope within one another and to clamp the edge portions of the filtering sheet 18. This filtering device will preferably be of sufficient diameter to rest over the upwardly and inwardly extending neck portion 13 of the bottom of the liner. This portion of the liner may be extended in the form of an inwardly and downwardly curved neck portion 13', as shown in Fig. 3.

As an alternative construction, the upwardly extending neck-portion 13 of the liner can be extended in cylindrical form, as indicated at 24, in Figs. 5, 6 and 7, to replace the glass ring. The modification shown in Fig. 5 is similar to that shown in Figs. 1 and 2, but the ring 17 is omitted. The filter cloth 18 is placed over the upper end of tube 16 and the tube is pushed up from below into the cylindrical neck 24 of the liner. In the form shown in Fig. 6, the neck 24 replaces the ring 22 of Fig. 3, and the ring 23 is adapted to fit over the neck to hold the filter cloth in position. The structure shown in Fig. 7 corresponds to the disclosure in Fig. 4 except for the fact that the extended neck 24 replaces the inner ring 19 of Fig. 4.

In the modifications shown in Figs. 8, 9 and 10, the central cylindrical neck portion of the liner extends downwardly (instead of upwardly) as indicated at 25. In Fig. 8 the sleeve 16 is pushed up over the neck 25 to hold the filter 18. As an alternative construction the filter cloth could be placed over the upper end of sleeve 16, and the sleeve pushed up into the neck 25 (the relative diameters of the neck and sleeve being changed accordingly.) In Fig. 9, the ring 23 is fitted over the neck 25 to hold the filter, although here again the ring might be proportioned to fit within the neck for the same purpose. In Fig. 10 the perforated sleeve 20 is fitted within the neck 25 to stretch the filter cloth 18 over the lower end of the sleeve.

In use, with the parts assembled as shown in Fig. 1, the cover 8 is removed and a certain quantity of ground coffee is placed within the liner 5, the quantity used depending upon the number of cups of coffee to be made and the strength desired. Hot water is then poured in on this ground coffee. The water seeps through the coffee and the liquid coffee flows through the filtering fabric sheet 18 and thence downwardly through opening 15 into the lower portion of the pot 1. In all of the modifications shown the downwardly curved annular portion surrounding the bottom outlet forms a sediment trap 26, below the level of the filtering device, wherein the excessively soggy coffee grounds and fine particles will settle so as not to clog the filter. The coffee may be poured through spout 3 while the liner 5 is in position, or the liner 5 (with the enclosed coffee grounds and filtering device) may be removed and the cover 8 may be positioned directly on top of pot 1. The pot with the liquid coffee therein may then be manipulated in the usual manner to pour the coffee.

It will now be apparent that all of the rigid units of this device are of comparatively simple construction and may be easily and economically pressed or blown from heat-resisting glass. The parts may be easily separated from one another and thoroughly washed, and there are no metal parts whatever to become fouled and taint the coffee. The sheet of filtering fabric 18 is inexpensive and may be discarded and replaced at frequent intervals. This is accomplished in an obvious manner by simply pushing apart the two telescoped annular glass members of the filtering device.

This apparatus can also be used for making cooled drinks by placing pieces of ice (and perhaps other materials) in the liner 5 and pouring water therethrough so that the cooled liquid will flow through the filter into the pot 1 in the manner already described.

I claim:

1. A coffee maker comprising a glass pot having an open upper end, a liner in the form of a glass receptacle having an open upper end and formed with projecting means adjacent its upper edge for removably supporting the liner within the upper portion of the pot, a cover for the liner, the central portion of the bottom wall of the liner extending upwardly and inwardly to a central circular opening, and a removable filter device consisting of a glass tube open at both ends and adapted to extend through the bottom opening in the liner, a glass ring adapted to telescope over the upper end of the tube and to rest on the upwardly projecting bottom wall of the liner, and a sheet of filtering material stretched over the upper end of the tube and clamped between the tube and ring.

2. A coffee maker comprising a glass pot having an open upper end, a liner in the form of a glass receptacle having an open upper end and formed with projecting means adjacent its upper edge for removably supporting the liner within the upper portion of the pot, a cover for the liner, the central portion of the bottom wall of the liner extending upwardly and inwardly to a central circular opening, and a removable filter device consisting of a glass tube adapted to project over the upwardly extending portion of the bottom wall of the liner about the opening therein, a glass ring adapted to telescope within the lower portion of the tube, and a sheet of filtering material stretched over the ring and clamped between the ring and tube, the tube being formed with a plurality of openings in its side wall above the position of the ring therein.

3. A coffee maker comprising a glass pot having an open upper end, a liner in the form of a glass receptacle having an open upper end and formed with projecting means adjacent its upper edge for removably supporting the liner within the upper portion of the pot, a cover for the liner, the central portion of the bottom wall of the liner extending upwardly and inwardly to a central circular opening, and a removable filter device consisting of a glass tube adapted to project over the upwardly extending portion of the bottom wall of the liner about the opening therein, a glass ring adapted to telescope within the lower portion of the tube, and to rest upon the upwardly extending edge of the bottom wall about the opening, and a sheet of filtering material stretched over the ring and clamped between the ring and tube, the tube being formed with a plurality of openings in its side wall above the position of the ring therein.

4. A coffee maker comprising a glass pot having an open upper end, a liner in the form of a glass receptacle having an open upper end and formed with projecting means adjacent its upper edge for removably supporting the liner within the upper portion of the pot, a cover for the liner, the bottom portion of the liner curving inwardly and downwardly and then upwardly to form an annular sediment trap and then terminating in a collar surrounding a central bottom opening, and a removable filter device adapted to be positioned over this bottom opening, this device comprising a pair of annular glass members adapted to telescope over one another, and a sheet of flexible filtering material stretched over one end of the inner annular member and clamped between the two telescoped members.

5. A coffee maker comprising a glass pot having an open upper end, a liner in the form of a glass receptacle having an open upper end and formed with projecting means adjacent its upper edge for removably supporting the liner within the upper portion of the pot, a cover for the liner, the bottom portion of the liner curving inwardly and downwardly and then upwardly to form an annular sediment trap and then terminating in an annular collar surrounding a central bottom opening, and a filter device adapted to close this opening and comprising a cylindrical glass collar positioned to form a continuation of the first mentioned collar and an annular glass member adapted to telescopically engage the cylindrical collar, and a sheet of flexible filtering material stretched over the end of the inner of the telescoped members and clamped at its edges between the members.

ARTHUR DOUGLAS NASH.